(12) United States Patent
Shyu

(10) Patent No.: US 6,189,021 B1
(45) Date of Patent: Feb. 13, 2001

(54) METHOD FOR FORMING TWO-DIMENSIONAL DISCRETE COSINE TRANSFORM AND ITS INVERSE INVOLVING A REDUCED NUMBER OF MULTIPLICATION OPERATIONS

(75) Inventor: Rong-Fuh Shyu, Hsinchu (TW)

(73) Assignee: Winbond Electronics Corp., Hsinchu (TW)

( * ) Notice: Under 35 U.S.C. 154(b), the term of this patent shall be extended for 0 days.

(21) Appl. No.: 09/153,055

(22) Filed: Sep. 15, 1998

(51) Int. Cl.[7] ..................................... G06F 17/14
(52) U.S. Cl. ............................. 708/401; 708/402
(58) Field of Search ..................... 708/400, 401, 708/402

(56) References Cited

U.S. PATENT DOCUMENTS

| | | | |
|---|---|---|---|
| 5,117,381 | * 5/1992 | Juri et al. | 708/402 |
| 5,257,213 | * 10/1993 | Kim et al. | 708/401 |
| 5,299,025 | * 3/1994 | Shirasawa | 358/400 |
| 5,831,881 | * 11/1998 | Fiedrich et al. | 708/402 |
| 5,894,430 | * 4/1999 | Ohara | 708/402 |

* cited by examiner

Primary Examiner—Ohuong Dinh Ngo
(74) Attorney, Agent, or Firm—Christensen O'Connor Johnson Kindness PLLC

(57) ABSTRACT

A set of scaled weighing coefficients is employed in the intrinsic multiplication stage of a six-stage DCT/IDCT fast algorithm for one of two one-dimensional DCT/IDCT operations so that a corresponding stage of the DCT/IDCT fast algorithm for the other one of the one-dimensional DCT/IDCT operations can be omitted. Accordingly, the number of multiplication operations for two-dimensional DCT/IDCT processing is reduced in order to achieve a higher processing speed.

6 Claims, 12 Drawing Sheets

BUTTERFLY OPERATION

INTRINSIC MULTIPLICATION

POST-ADDITION MULTIPLICATION

POST-MULTIPLICATION SUBTRACTION

| c0*c0 | c0*c1 | c0*c2 | c0*c3 | c0*c4 | c0*c5 | c0*c6 | c0*c7 |
|---|---|---|---|---|---|---|---|
| c1*c0 | c1*c1 | c1*c2 | c1*c3 | c1*c4 | c1*c5 | c1*c6 | c1*c7 |
| c2*c0 | c2*c1 | c2*c2 | c2*c3 | c2*c4 | c2*c5 | c2*c6 | c2*c7 |
| c3*c0 | c3*c1 | c3*c2 | c3*c3 | c3*c4 | c3*c5 | c3*c6 | c3*c7 |
| c4*c0 | c4*c1 | c4*c2 | c4*c3 | c4*c4 | c4*c5 | c4*c6 | c4*c7 |
| c5*c0 | c5*c1 | c5*c2 | c5*c3 | c5*c4 | c5*c5 | c5*c6 | c5*c7 |
| c6*c0 | c6*c1 | c6*c2 | c6*c3 | c6*c4 | c6*c5 | c6*c6 | c6*c7 |
| c7*c0 | c7*c1 | c7*c2 | c7*c3 | c7*c4 | c7*c5 | c7*c6 | c7*c7 |

FIG. 6A

| p0*p0 | p0*p1 | p0*p2 | p0*p3 | p0*p4 | p0*p5 | p0*p6 | p0*p7 |
|---|---|---|---|---|---|---|---|
| p1*p0 | p1*p1 | p1*p2 | p1*p3 | p1*p4 | p1*p5 | p1*p6 | p1*p7 |
| p2*p0 | p2*p1 | p2*p2 | p2*p3 | p2*p4 | p2*p5 | p2*p6 | p2*p7 |
| p3*p0 | p3*p1 | p3*p2 | p3*p3 | p3*p4 | p3*p5 | p3*p6 | p3*p7 |
| p4*p0 | p4*p1 | p4*p2 | p4*p3 | p4*p4 | p4*p5 | p4*p6 | p4*p7 |
| p5*p0 | p5*p1 | p5*p2 | p5*p3 | p5*p4 | p5*p5 | p5*p6 | p5*p7 |
| p6*p0 | p6*p1 | p6*p2 | p6*p3 | p6*p4 | p6*p5 | p6*p6 | p6*p7 |
| p7*p0 | p7*p1 | p7*p2 | p7*p3 | p7*p4 | p7*p5 | p7*p6 | p7*p7 |

FIG. 6B

METHOD FOR FORMING TWO-DIMENSIONAL DISCRETE COSINE TRANSFORM AND ITS INVERSE INVOLVING A REDUCED NUMBER OF MULTIPLICATION OPERATIONS

BACKGROUND OF THE INVENTION

1. Field of the Invention

The invention relates to a method for performing discrete cosine transform (DCT) and its inverse, more particularly to a method for performing two-dimensional DCT/IDCT involving a reduced number of multiplication operations.

2. Description of the Related Art

U.S. Pat. No. 5,471,412 by the applicant discloses a discrete cosine transform (DCT) and an inverse discrete cosine transform (IDCT) method and apparatus that use six-stage DCT/IDCT fast algorithms to process a sequence of input data of an 8×8 data block. The six stages of the DCT/IDCT fast algorithms generally consist of interleaved butterfly operation stages and multiplication operation stages. The multiplication operation stages include intrinsic multiplication operations, post-addition multiplication operations, and post-multiplication subtraction operations. In the aforementioned U.S. Patent, the entire disclosure of which is incorporated herein by reference, a single butterfly operation unit performs the butterfly operation stages, while a single multiplication operation unit performs the multiplication operation stages. The butterfly operation unit and the multiplication operation unit operate in a recycling and parallel processing manner so that DCT and IDCT can be achieved efficiently with a relatively inexpensive hardware cost.

FIGS. 1 and 3 respectively illustrate flow graphs of the six-stage DCT and IDCT fast algorithms employed in the aforesaid U.S. patent. The DCT fast algorithm uses three kinds of arithmetic operations: butterfly, intrinsic multiplication, and post-addition multiplication, as shown in FIGS. 2A to 2C. The IDCT fast algorithm also uses three kinds of arithmetic operations: butterfly, intrinsic multiplication, and post-multiplication subtraction, as shown in FIGS. 2A, 2B and 2D.

Referring again to FIG. 1, the six stages of the DCT fast algorithm include a first stage involving four butterfly operations, a second stage involving two post-addition multiplication operations, a third stage involving four butterfly operations, a fourth stage involving three post-addition multiplication operations, a fifth stage involving four butterfly operations, and a sixth stage involving eight intrinsic multiplication operations.

Referring to FIG. 3, the six stages of the IDCT fast algorithm include a first stage involving eight intrinsic multiplication operations, a second stage involving four butterfly operations, a third stage involving three post-multiplication subtraction operations, a fourth stage involving four butterfly operations, a fifth stage involving two post-multiplication subtraction operations, and a sixth stage involving four butterfly operations.

In general, multiplication operations for DCT/IDCT are relatively time-consuming and require relatively complex hardware. Although the aforementioned U.S. Patent employs a fast algorithm that involves only thirteen multiplication operations for one-dimensional transformation, or a total number of 208 (2×8×13) multiplication operations for two-dimensional transformation of an 8×8 data block, it is desirable to further reduce the number of multiplication operations in order to achieve a higher processing speed.

SUMMARY OF THE INVENTION

Therefore, the object of the present invention is to provide a method for performing two-dimensional DCT/IDCT involving a reduced number of multiplication operations.

According to one aspect of the present invention, there is provided a two-dimensional discrete cosine transform (DCT) method involving consecutive first and second one-dimensional DCT operations. Each of the first and second one-dimensional DCT operations uses a six-stage DCT fast algorithm to process a sequence of input data of an 8×8 data block so as to generate a sequence of transform data. The DCT fast algorithm includes first, third and fifth stages that involve a plurality of butterfly operations, second and fourth stages that involve a plurality of post-addition multiplication operations, and a sixth stage that involves a plurality of intrinsic multiplication operations. The two-dimensional DCT method comprises the steps of:

(a) providing an input unit to receive the input data;

(b) controlling the input unit to provide the input data to a butterfly operation unit in order to enable the butterfly operation unit to perform the first stage of the DCT fast algorithm for the first one-dimensional DCT operation;

(c) controlling a data register unit to store first-stage output data from the butterfly operation unit therein;

(d) controlling the data register unit to provide predetermined ones of the first-stage output data to a multiplication operation unit in order to enable the multiplication operation unit to perform the second stage of the DCT fast algorithm when the predetermined ones of the first-stage output data have been stored in the data register unit;

(e) controlling the data register unit to store second-stage output data from the multiplication operation unit therein;

(f) controlling the data register unit to provide the first-stage and second-stage output data in a predetermined sequence to the butterfly operation unit in order to enable the butterfly operation unit to perform the third stage of the DCT fast algorithm after the butterfly operation unit has finished performing the first stage of the DCT fast algorithm;

(g) controlling the data register unit to store third-stage output data from the butterfly operation unit therein;

(h) controlling the data register unit to provide predetermined ones of the third-stage output data to the multiplication operation unit in order to enable the multiplication operation unit to perform the fourth stage of the DCT fast algorithm when the predetermined ones of the third-stage output data have been stored in the data register unit;

(i) controlling the data register unit to store fourth-stage output data from the multiplication operation unit therein;

(j) controlling the data register unit to provide the third-stage and fourth-stage output data in a predetermined sequence to the butterfly operation unit in order to enable the butterfly operation unit to perform the fifth stage of the DCT fast algorithm after the butterfly operation unit has finished performing the third stage of the DCT fast algorithm;

(k) controlling the data register unit to store fifth-stage output data from the butterfly operation unit therein, the fifth-stage output data serving as scaled one-dimensional transform data;

(l) controlling the data register unit to provide a transposed order of the scaled one-dimensional transform data to the butterfly operation unit in order to enable the butterfly operation unit to perform the first stage of the DCT fast algorithm for the second one-dimensional DCT operation;

(m) repeating steps (c) to (j) to perform the second to fifth stages of the DCT fast algorithm for the second one-dimensional DCT operation;

(n) controlling the data register unit to store the fifth-stage output data from the butterfly operation unit therein, the fifth-stage output data serving as scaled two-dimensional transform data;

(o) controlling the data register unit to provide the scaled two-dimensional transform data to the multiplication operation unit in order to enable the multiplication operation unit to perform the sixth stage of the DCT fast algorithm for the second one-dimensional DCT operation based on a set of scaled weighing coefficients stored in a coefficient ROM of the multiplication operation unit, thereby resulting in the two-dimensional transform data corresponding to the input data, the scaled weighing coefficients being a product of sixth-stage weighing coefficients of the DCT fast algorithms for the first and second one-dimensional DCT operations; and (p) controlling an output unit to receive the two-dimensional transform data from the multiplication operation unit.

According to another aspect of the present invention, there is provided a two-dimensional inverse discrete cosine transform (IDCT) method involving consecutive first and second one-dimensional IDCT operations. Each of the first and second one-dimensional IDCT operations uses a six-stage IDCT fast algorithm to process a sequence of input data of an 8×8 data block so as to generate a sequence of transform data. The IDCT fast algorithm includes a first stage that involves a plurality of intrinsic multiplication operations, second, fourth and sixth stages that involve a plurality of butterfly operations, and third and fifth stages that involve a plurality of post-multiplication subtraction operations. The two-dimensional IDCT method comprises the steps of:

(a) providing an input unit to receive the input data;

(b) controlling the input unit to provide the input data to a multiplication operation unit in order to enable the multiplication operation unit to perform the first stage of the IDCT fast algorithm for the first one-dimensional IDCT operation based on a set of scaled weighing coefficients stored in a coefficient ROM of the multiplication operation unit, the scaled weighing coefficients being a product of first-stage weighing coefficients of the IDCT fast algorithms for the first and second one-dimensional IDCT operations;

(c) controlling a data register unit to store scaled first-stage output data from the multiplication operation unit therein;

(d) controlling the data register unit to provide the scaled first-stage output data to a butterfly operation unit in order to enable the butterfly operation unit to perform the second stage of the IDCT fast algorithm for the first one-dimensional IDCT operation;

(e) controlling the data register unit to store second-stage output data from the butterfly operation unit therein;

(f) controlling the data register unit to provide predetermined ones of the second-stage output data to the multiplication operation unit in order to enable the multiplication operation unit to perform the third stage of the IDCT fast algorithm when the predetermined ones of the second-stage output data have been stored in the data register unit;

(g) controlling the data register unit to store third-stage output data from the multiplication operation unit therein;

(h) controlling the data register unit to provide the second-stage and third-stage output data in a predetermined sequence to the butterfly operation unit in order to enable the butterfly operation unit to perform the fourth stage of the IDCT fast algorithm after the butterfly operation unit has finished performing the second stage of the IDCT fast algorithm;

(i) controlling the data register unit to store fourth-stage output data from the butterfly operation unit therein;

(j) controlling the data register unit to provide predetermined ones of the fourth-stage output data to the multiplication operation unit in order to enable the multiplication operation unit to perform the fifth stage of the IDCT fast algorithm when the predetermined ones of the fourth-stage output data have been stored in the data register unit;

(k) controlling the data register unit to store fifth-stage output data from the multiplication operation unit therein;

(l) controlling the data register unit to provide the fourth-stage and fifth-stage output data in a predetermined sequence to the butterfly operation unit in order to enable the butterfly operation unit to perform the sixth stage of the IDCT fast algorithm after the butterfly operation unit has finished performing the fourth stage of the IDCT fast algorithm;

(m) controlling the data register unit so as to store scaled one-dimensional transform data generated by the butterfly operation unit in step (l) therein;

(n) controlling the data register unit to provide a transposed order of the scaled one-dimensional transform data to the butterfly operation unit in order to enable the butterfly operation unit to perform the second stage of the IDCT fast algorithm for the second one-dimensional IDCT operation;

(o) repeating steps (e) to (l) to perform the third to sixth stages of the IDCT fast algorithm for the second one-dimensional IDCT operation; and (p) after step (o), controlling an output unit to receive the sixth-stage output data from the butterfly operation unit as the two-dimensional transform data corresponding to the input data.

BRIEF DESCRIPTION OF THE DRAWINGS

Other features and advantages of the present invention will become apparent in the following detailed description of the preferred embodiments with reference to the accompanying drawings, of which:

FIG. 6A illustrates a set of scaled weighing coefficients used in the DCT method of the preferred embodiment;

FIG. 6B illustrates a set of scaled weighing coefficients used in the IDCT method of the preferred embodiment;

DETAILED DESCRIPTION OF THE PREFERRED EMBODIMENTS

Figure 4:
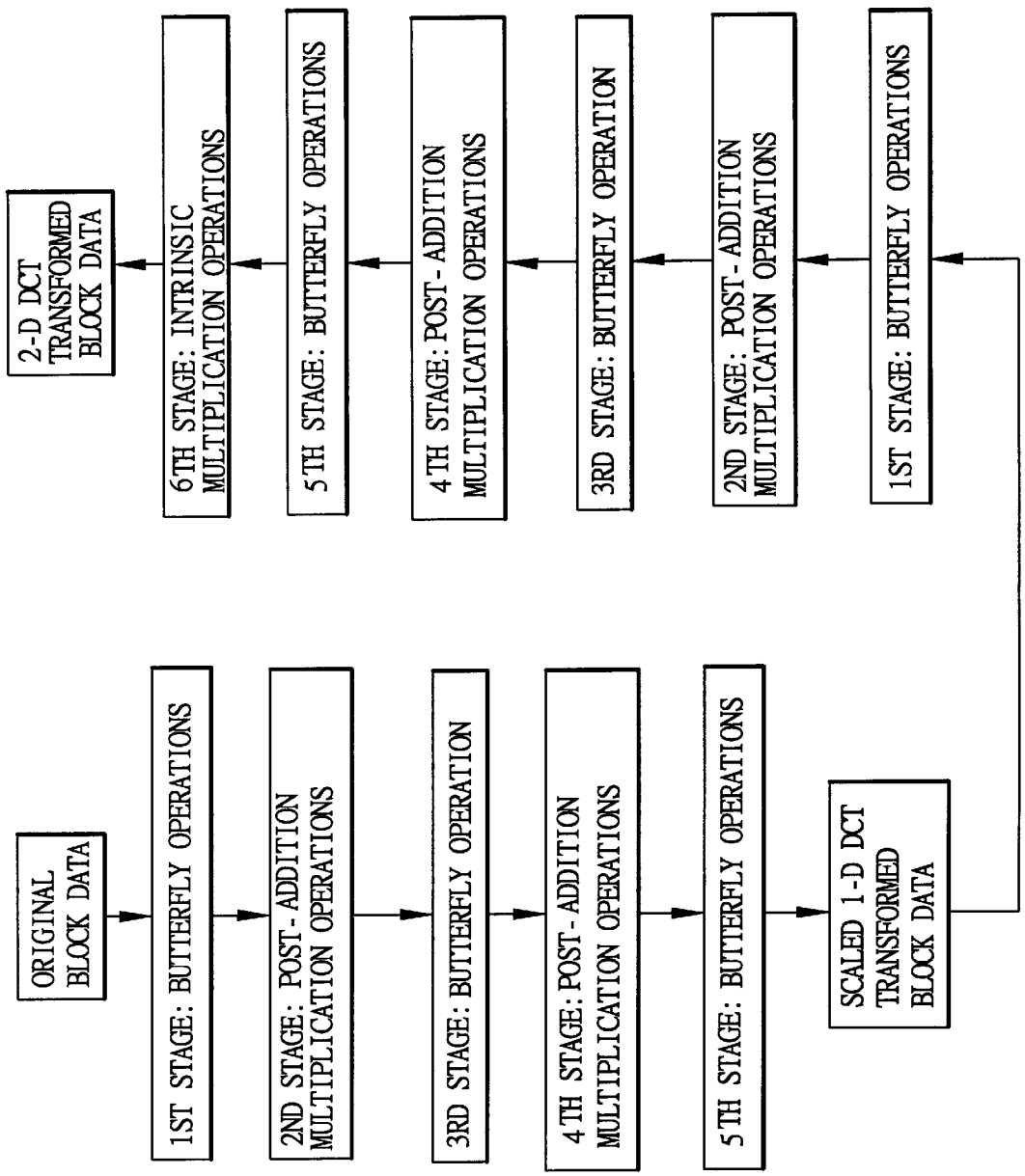
FIG. 4 is a flow diagram of the preferred embodiment of a DCT method according to the present invention.

Referring to FIG. 4, the preferred embodiment of a two-dimensional DCT method according to the present invention is shown to involve consecutive first and second one-dimensional DCT operations. The first one-dimensional DCT operation includes the first five stages of the DCT fast algorithm shown in FIG. 1, and is performed to obtain a scaled one-dimensional DCT block data from an input original block data. The second one-dimensional DCT operation includes the six stages of the DCT fast algorithm shown in FIG. 1, and is performed to obtain the two-dimensional DCT block data from the scaled one-dimensional DCT block data.

Figure 1:
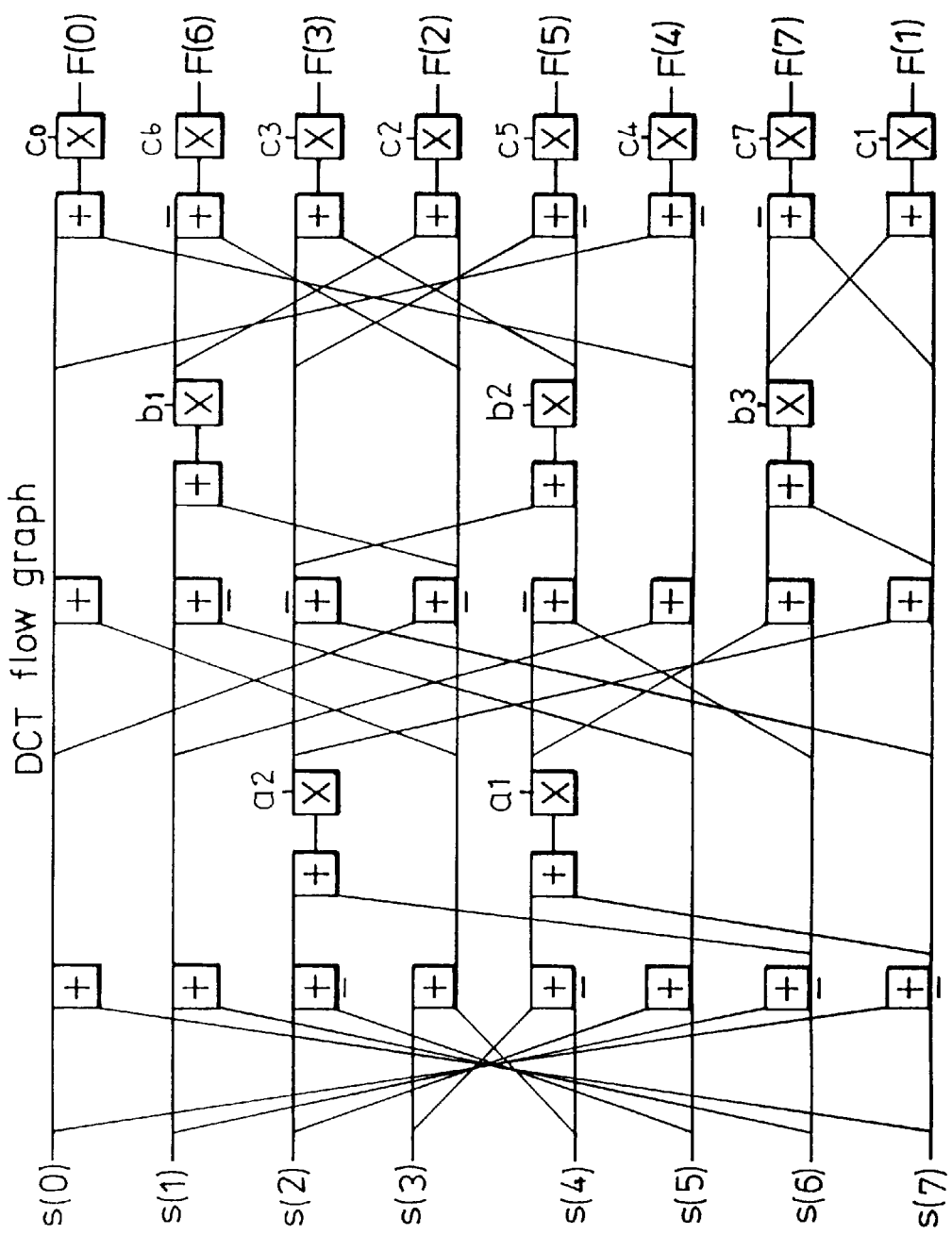
FIG. 1 is a flow graph of a DCT fast algorithm that is used in a one-dimensional transform operation of a DCT apparatus in the prior art.
Figure 2A:
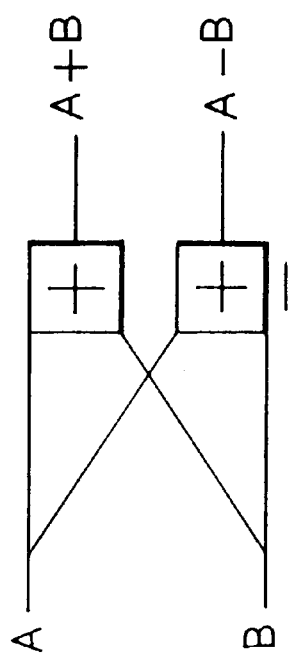
FIG. 2A illustrates a butterfly operation in the flow graph of FIG. 1.
Figure 2B:
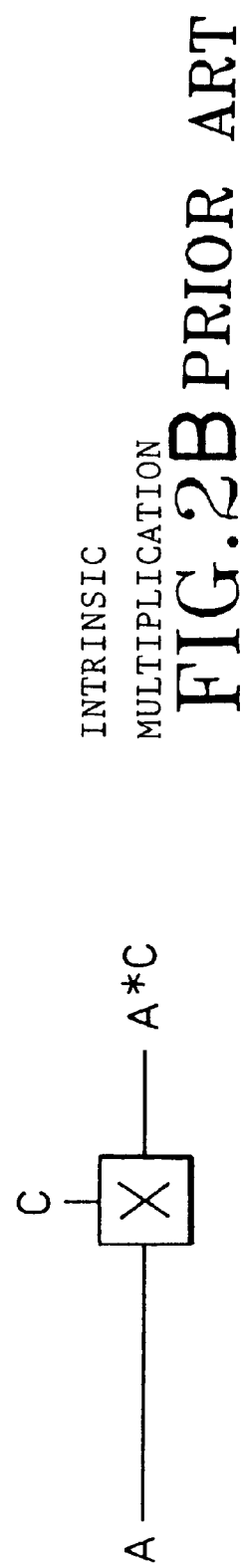
FIG. 2B illustrates an intrinsic multiplication operation in the flow graph of FIG. 1.
Figure 2C:
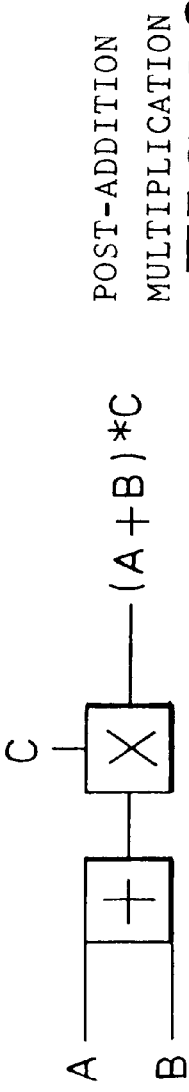
FIG. 2C illustrates a post-addition multiplication operation in the flow graph of FIG. 1.
Figure 2D:
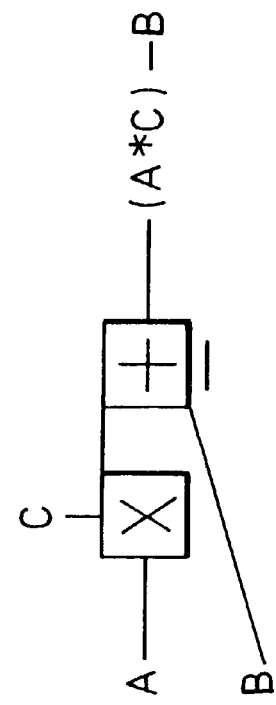
FIG. 2D illustrates a post-multiplication subtraction operation that is used in an IDCT fast algorithm.

The coefficients used in the post-addition multiplication operations of the second and fourth stages of each of the first and second one-dimensional DCT operations are a1, a2, b1, b2, and b3, respectively, as shown in FIG. 1. However, because the sixth stage of the DCT fast algorithm is omitted in the first one-dimensional DCT operation in the DCT method of the present invention, a set of scaled weighing coefficients is used in the intrinsic multiplication operations of the sixth stage of the DCT fast algorithm for the second one-dimensional DCT operation. FIG. 6A shows the scaled weighing coefficients $C_{i,j}$ for the second one-dimensional DCT operation and used in the processing of an 8×8 matrix that corresponds to a block of data. As illustrated, the original weighing coefficients used in the intrinsic multiplication operations of the sixth stage of the DCT fast algorithm for the second one-dimensional DCT operation are scaled by a scaler that differs row by row (or column by column). The scalers ($c_i$) for the first to eighth rows (or columns) are c0, c1, c2, c3, c4, c5, c6 and c7, respectively, if cj (j=0 to 7) are the original weighing coefficients used in the intrinsic multiplication operations of the DCT fast algorithm shown in FIG. 1. That is to say, the original weighing coefficients ($c_j$) of the intrinsic multiplication operations for an (i)th row (or column) are scaled to become $C_{i,j}$, which are equal to the product of ci and cj, where i and j=0 to 7 for (j)th one-dimensional transformed data of each row (or column), e.g. F(j) as shown in FIG. 1.

Figure 5:
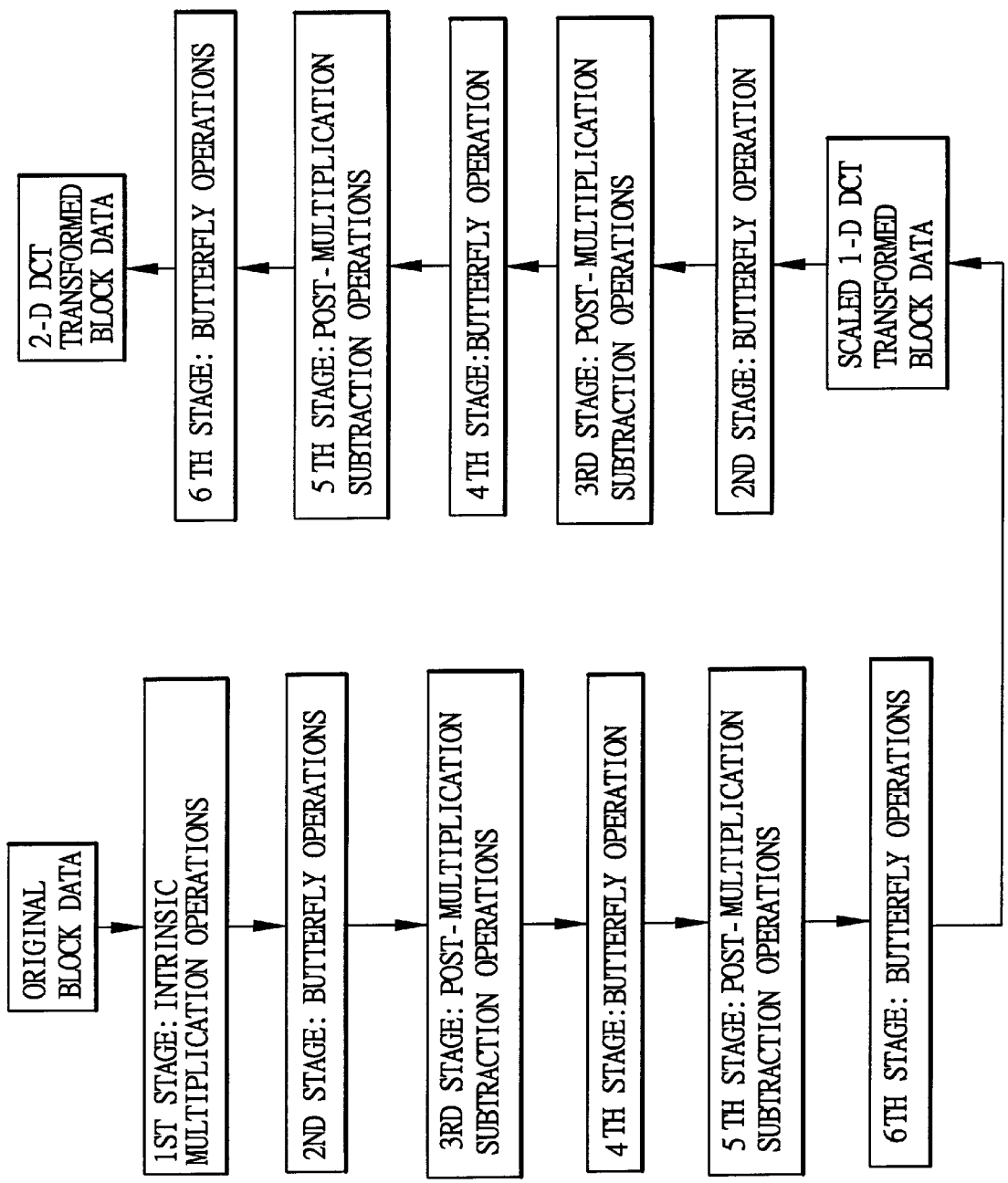
FIG. 5 is a flow diagram of the preferred embodiment of an IDCT method according to the present invention.

Referring to FIG. 5, the preferred embodiment of a two-dimensional IDCT method according to the present invention is shown to involve consecutive first and second one-dimensional IDCT operations. The first one-dimensional IDCT operation includes the six stages of the IDCT fast algorithm shown in FIG. 3, and is performed to obtain a scaled one-dimensional IDCT block data from an input original block data. The second one-dimensional IDCT operation includes the latter five stages of the IDCT fast algorithm shown in FIG. 3, and is performed to obtain the two-dimensional IDCT block data from the scaled one-dimensional IDCT block data.

Figure 3:
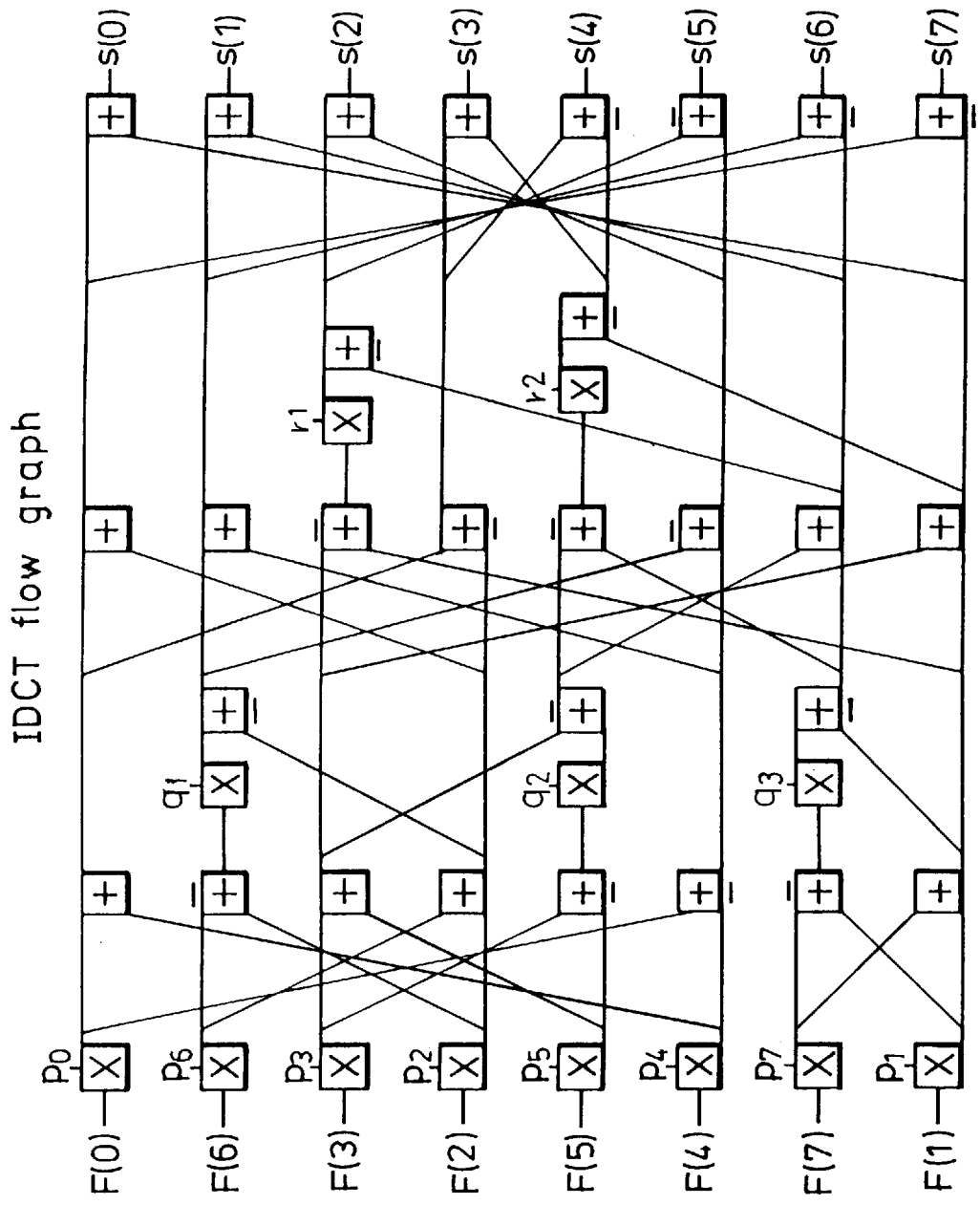
FIG. 3 is a flow graph of an IDCT fast algorithm that is used in a one-dimensional transformation operation of an IDCT apparatus in the prior art.

The coefficients used in the post-multiplication subtraction operations of the third and fifth stages of each of the first and second one-dimensional IDCT operations are q1, q2, q3, r1, and r2, respectively, as shown in FIG. 3. However, because the first stage of the IDCT fast algorithm is omitted in the second one-dimensional IDCT operation in the IDCT method of the present invention, a set of scaled weighing coefficients is used in the intrinsic multiplication operations of the first stage of the IDCT fast algorithm for the first one-dimensional IDCT operation. FIG. 6B shows the scaled weighing coefficients $P_{i,j}$ for the first one-dimensional IDCT operation and used in the processing of an 8×8 matrix that corresponds to a block of data. As illustrated, the original weighing coefficients used in the intrinsic multiplication operations of the first stage of the IDCT fast algorithm for the first one-dimensional IDCT operation are scaled by a scaler that differs row by row (or column by column). The scalers ($p_i$) for the first to eighth rows (or columns) are p0, p1, p2, p3, p4, p5, p6 and p7, respectively, if pj (j=0 to 7) are the original weighing coefficients used in the intrinsic multiplication operations of the IDCT fast algorithm shown in FIG. 3. That is to say, the original weighing coefficients (pj) of the intrinsic multiplication operations for an (i)th row (or column) are scaled to become $P_{i,j}$, which are equal to the product of pi and pj, where i and j=0 to 7 for (j)th original data of each row (or column), e.g. F(j) as shown in FIG. 3.

Figure 7:
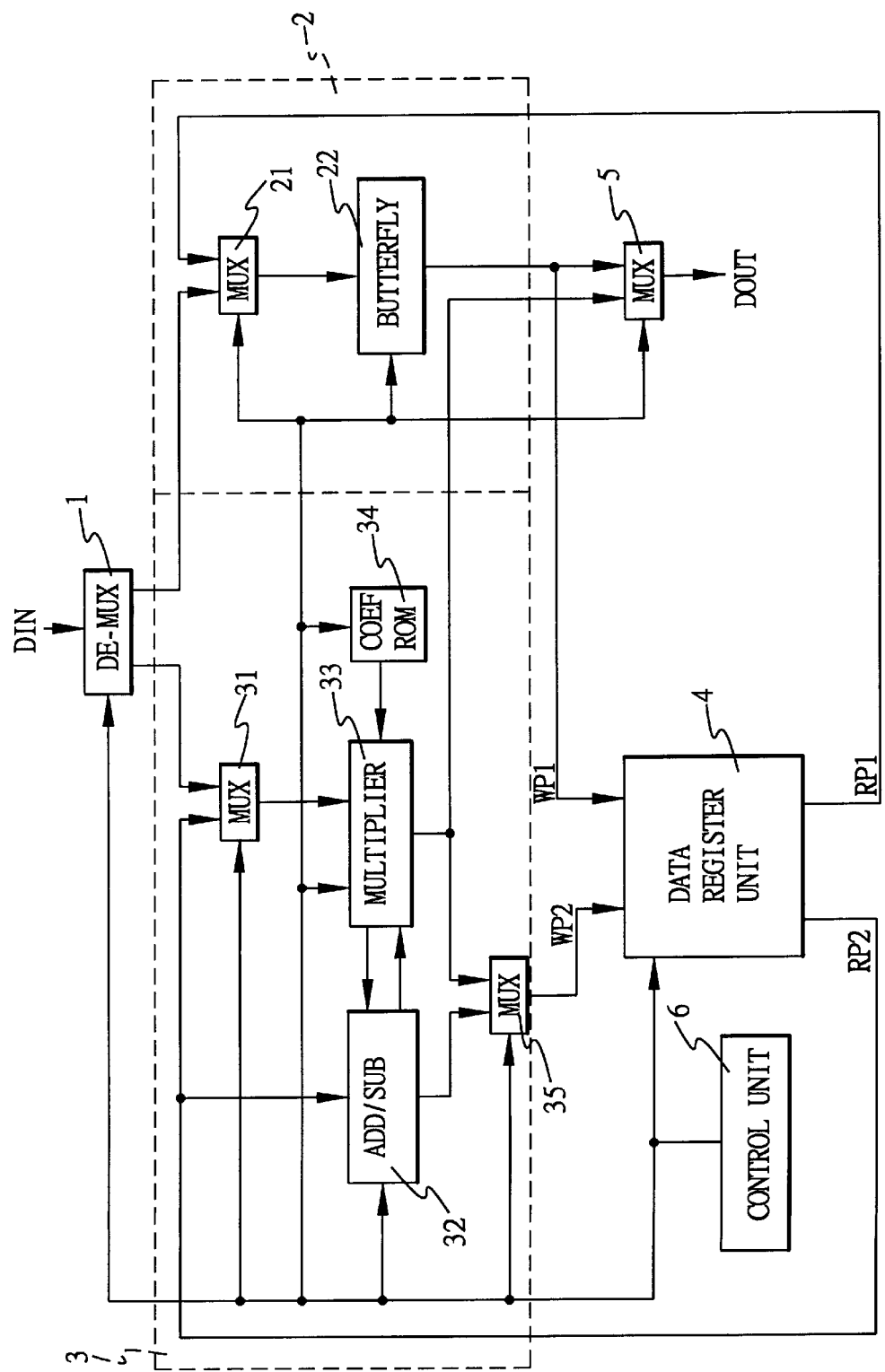
FIG. 7 is a schematic circuit block diagram of one example of a DCT/IDCT apparatus for performing the DCT/IDCT methods of the preferred embodiment.

FIG. 7 illustrates an DCT/IDCT apparatus for performing the DCT/IDCT methods of the preferred embodiment. The DCT/IDCT apparatus is generally similar in construction to that described in U.S. Pat. No. 5,471,412, and is shown to comprise an input unit 1, a butterfly operation unit 2, a multiplication operation unit 3, a data register unit 4, an output unit 5 and a control unit 6.

The input unit 1 is a demultiplexer which receives a sequence of serial input data (Din) of an 8×8 data block from an external device (not shown). The input unit 1 is operable so as to send the input data (Din) to the butterfly operation unit 2 or to the multiplication operation unit 3 in accordance with the intended transform operation.

The butterfly operation unit 2 includes a multiplexer 21 and a butterfly circuit 22. The butterfly circuit 22 generates the sum and difference of two input data thereto. The multiplexer 21 has a select input which is connected to the control unit 6, and data inputs which are connected to the input unit 1 and the data register unit 4. The control unit 6 controls the multiplexer 21 to select the input data (Din) from the input unit 1 or data from the data register unit 4, and provides the selected data to the butterfly circuit 22 to enable the latter to perform a butterfly operation. The output of the butterfly circuit 22 is stored in the data register unit 4 or is sent to the output unit 5.

The multiplication operation unit 3 includes an input select multiplexer 31, an addition/subtraction circuit 32, a multiplier circuit 33, a coefficient ROM 34, and an output select multiplexer 35. The coefficient ROM 34 contains a plurality of weighing coefficients, including the scaled weighing coefficients shown in FIGS. 6A or 6B, that serve as one of the operand inputs to the multiplier circuit 33. The multiplication operation unit 3 is capable of performing intrinsic multiplication, post-addition multiplication and post-multiplication subtraction. Input data (Din) from the input unit 1 or data from the data register unit 4 is sent to the addition/subtraction circuit 32 or to the input select multiplexer 31 in order to enable the multiplication operation unit 3 to perform the intended arithmetic operation. The outputs of the addition/subtraction circuit 32 and the multiplier circuit 33 are sent to the output select multiplexer 35 so as to be stored in the data register unit 4. The output of the multiplier circuit 33 can also be sent directly to the output unit 5.

As to how the multiplication operation unit 3 executes an intrinsic multiplication operation, a post-addition multiplication operation, or a post-multiplication subtraction operation, since these have been described in the aforementioned U.S. patent, a description of the same will be omitted herein for the sake of brevity.

The data register unit 4 is a four-port register with two write ports (WP1, WP2) and two read ports (RP1, RP2). The first set of read and write ports (RP1, WP1) are connected to the butterfly operation unit 2, while the second set of read and write ports (RP2, WP2) are connected to the multiplication operation unit 3. The data register unit 4 serves to store data from the butterfly operation unit 2 and the multiplication operation unit 3, and further serves to provide data thereto.

The output unit 5 is a multiplexer which selects the output of the butterfly circuit 22 or the multiplier circuit 33, depending on whether DCT or IDCT is being performed.

Finally, the control unit 6 is responsible for controlling the read/write operations of the coefficient ROM 34 and the data register unit 4, and is also responsible for controlling the various multiplexers 21, 31, 35. The control unit 6 is further responsible for controlling the timing of the operations of the remaining components of the DCT/IDCT apparatus.

Figure 8:
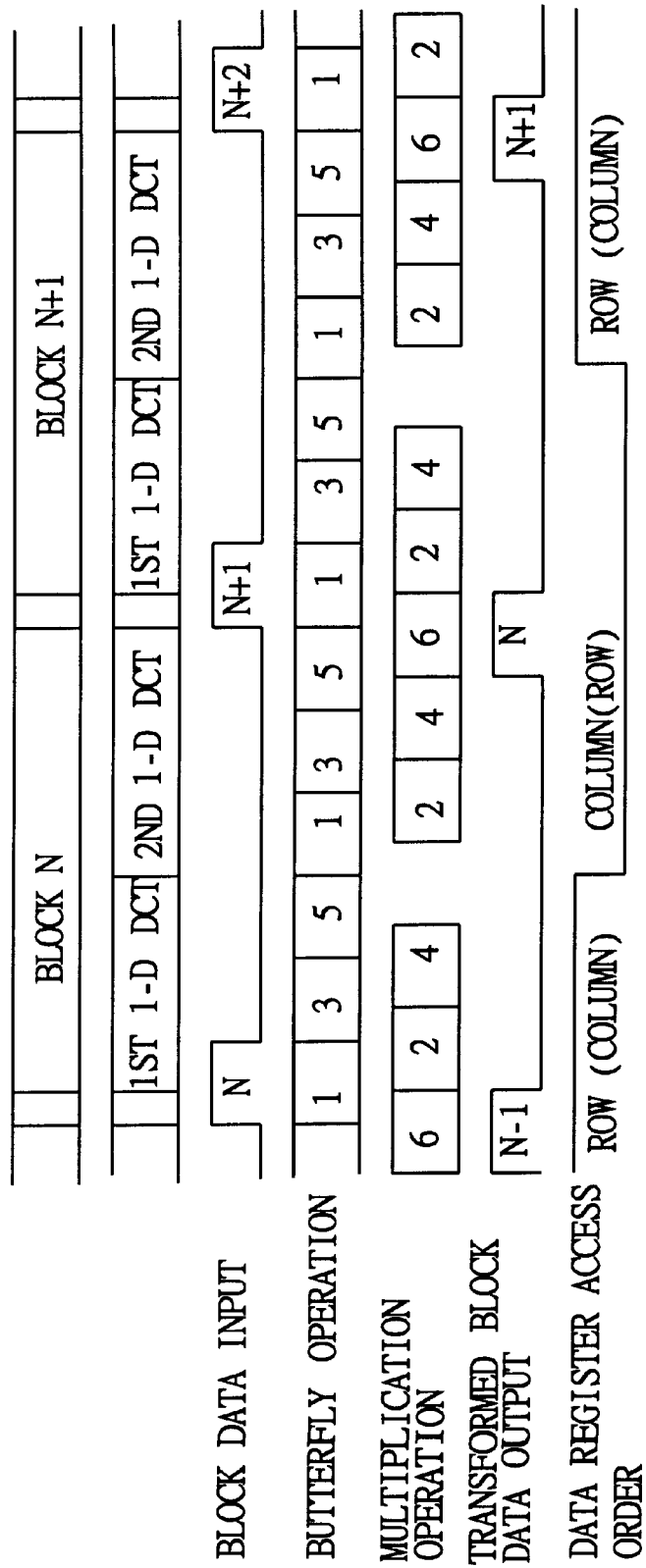
FIG. 8 is a timing diagram illustrating the operation of the apparatus of FIG. 7 when performing two-dimensional DCT.
Figure 9:
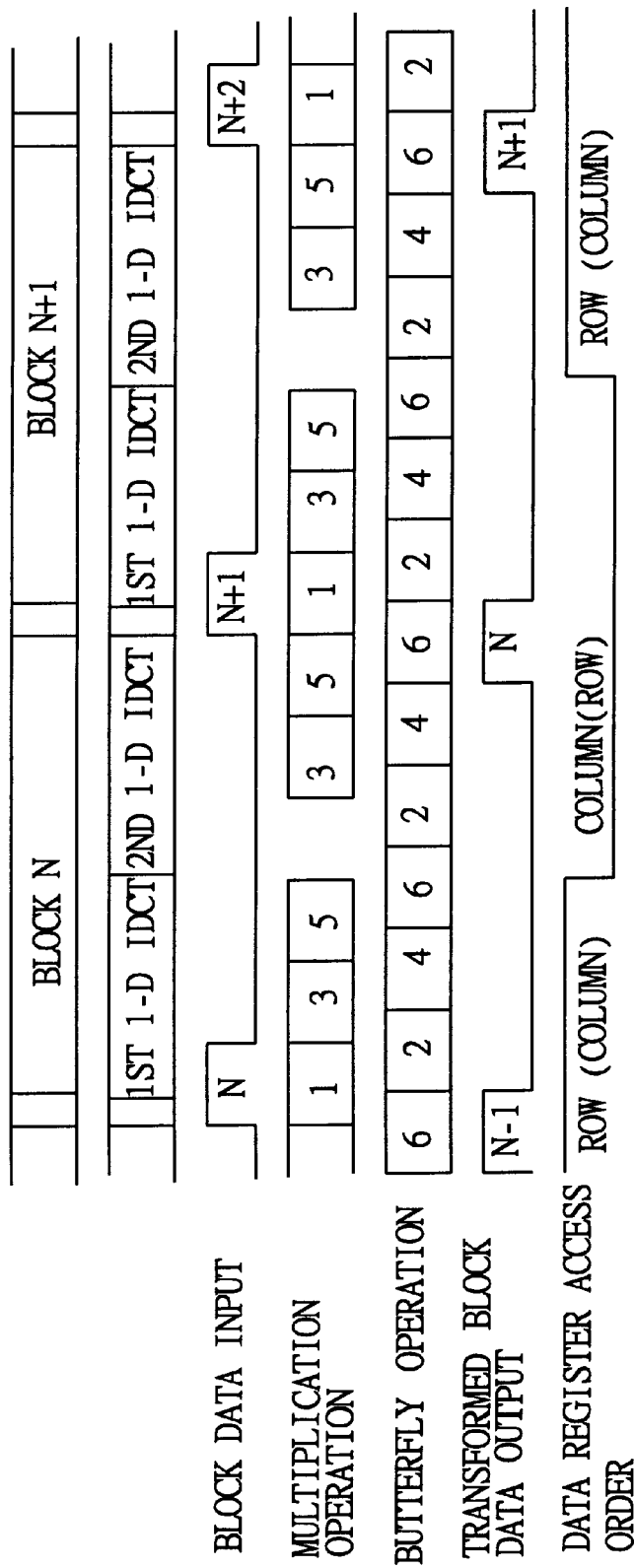
FIG. 9 is a timing diagram illustrating the operation of the apparatus of FIG. 7 when performing two-dimensional IDCT.

FIGS. 8 and 9 are timing diagrams which illustrate the operation of the apparatus when performing the DCT and IDCT methods of the preferred embodiment. In the present invention, for a data block (N) undergoing two-dimensional DCT/IDCT, scaled one-dimensional transform data is obtained after the first one-dimensional DCT/IDCT operation. The scaled one-dimensional transform data then undergoes the second one-dimensional DCT/IDCT operation in order to obtain the two-dimensional DCT/IDCT data. In the DCT/IDCT apparatus of FIG. 7, the first stage of the first one-dimensional DCT/IDCT operation is performed immediately upon receiving the input data block (N). The two-dimensional DCT/IDCT data is obtained from the output of the sixth stage of the second one-dimensional DCT/IDCT operation. During two-dimensional DCT/IDCT, the results of the first one-dimensional DCT/IDCT operation of a data block (N) are stored in the data register unit 4. This is necessary since the transformed data block obtained from the first one-dimensional DCT/IDCT operation has to be transposed for processing in columns if the original data block was input in rows. The construction of the data register unit 4 permits the butterfly operation unit 2 and the multiplication operation unit 3 to read and write data therein at the same time, thereby enabling the latter two to achieve recycling and parallel pipeline processing.

The following is a detailed description of how the apparatus of FIG. 7 performs the DCT and IDCT methods of the preferred embodiment:

Referring again to FIGS. 7 and 8, during the first one-dimensional DCT operation, the sixty-four pixel data of an 8×8 pixel block are sequentially provided to the input unit 1 in rows (or columns). The control unit 6 controls the input unit 1 to send the input pixel data (Din) to the butterfly operation unit 2 in order to enable the latter to perform the first stage of the DCT fast algorithm which involves four butterfly operations for each row (or column). The control unit 6 then controls the data register unit 4 so that the first-stage output data from the butterfly operation unit 2 are stored therein via the write port (WP1). When predetermined ones of the first-stage output data have been stored in the data register unit 4, the control unit 6 controls the data register unit 4 to provide the predetermined ones of the first-stage output data to the multiplication operation unit 3 via the read port (RP2) in order to enable the latter to begin performing the second stage of the DCT fast algorithm which involves two post-addition multiplication operations for each row (or column), while the butterfly operation unit 2 continues to perform the first stage of the DCT fast algorithm. The control unit 6 again controls the data register unit 4 to store the second-stage output data from the multiplication operation unit 3 therein via the write port (WP2). After the butterfly operation unit 2 has finished performing the first stage of the DCT fast algorithm, the control unit 6 controls the data register unit 4 to provide the first-stage and second-stage output data in a predetermined sequence to the butterfly operation unit 2 via the read port (RP1) in order to enable the latter to perform the third stage of the DCT fast algorithm which involves four more butterfly operations for each row (or column). The control unit 6 again controls the data register unit 4 to store the third-stage output data from the butterfly operation unit 2 therein via the write port (WP1). When predetermined ones of the third-stage output data have been stored in the data register unit 4, the control unit 6 controls the data register unit 4 to provide the predetermined ones of the third-stage output data to the multiplication operation unit 3 via the read port (RP2) in order to enable the latter to begin performing the fourth stage of the DCT fast algorithm which involves three post-addition multiplication operations for each row (or column), while the butterfly operation unit 2 continues to perform the third stage of the DCT fast algorithm. The control unit 6 again controls the data register unit 4 to store the fourth-stage output data from the multiplication operation unit 3 therein via the write port (WP2). After the butterfly operation unit 2 has finished performing the third stage of the DCT fast algorithm, the control unit 6 controls the data register unit 4 to provide the third-stage and fourth-stage output data in a predetermined sequence to the butterfly operation unit 2 via the read port (RP1) in order to enable the latter to perform the fifth stage of the DCT fast algorithm which involves another four butterfly operations for each row (or column). The control unit 6 again controls the data register unit 4 to store the fifth-stage output data from the butterfly operation unit 2 therein via the write port (WP1). The fifth-stage output data serve as the scaled one-dimensional transform data of the first one-dimensional DCT operation.

Unlike the two-dimensional DCT method disclosed in the aforementioned U.S. Patent, the sixth stage of the DCT fast algorithm is omitted in the first one-dimensional DCT operation. Thus, when the scaled one-dimensional transform data is stored in the data register unit 4, the control unit 6 controls the data register unit 4 to output sequentially a transposed order of the scaled one-dimensional transform data to the butterfly operation unit 2, e.g. in columns (or rows), via the read port (RP1) of the same, thereby enabling the butterfly operation unit 2 to perform the first stage of the DCT fast algorithm for the second one-dimensional DCT operation. The second to fifth stages of the DCT fast algorithm for the second one-dimensional DCT operation are then performed in a manner similar to that for the second to fifth stages of the DCT fast algorithm for the first one-dimensional DCT operation. Thereafter, the control unit 6 controls the data register unit 4 to store the fifth-stage output data from the butterfly operation unit 2 therein via the write port (WP1). The fifth-stage output data serve as the scaled two-dimensional transform data of the second one-dimensional DCT operation.

Subsequently, the control unit 6 controls the data register unit 4 to provide the scaled two-dimensional transform data to the multiplication operation unit 3 via the read port (RP2) in order to enable the latter to perform the sixth stage of the DCT fast algorithm for the second one-dimensional DCT operation, which involves eight intrinsic multiplication operations for each row (or column), based on the set of weighing coefficients shown in FIG. 6A and stored in the coefficient ROM 34, thereby resulting in the two-dimensional transform data corresponding to the input pixel data (Din). Finally, the control unit 6 controls the output unit 5 to receive the two-dimensional transform data from the multiplier circuit 33 of the multiplication operation unit 3 in order to provide the same to an external device (not shown).

Referring again to FIGS. 7 and 9, during the first one-dimensional IDCT operation, the sixty-four transform data of an 8×8 transform data block are sequentially provided to the input unit 1 in rows (or columns). The control unit 6 controls the input unit 1 to send the input transform data (Din) to the multiplication operation unit 3 in order to enable the latter to perform the first stage of the IDCT fast algorithm which involves eight intrinsic multiplication operations for each row (or column). Unlike the two-dimensional IDCT method disclosed in the aforementioned U.S. Patent, the first stage of the IDCT fast algorithm for the first one-dimensional IDCT operation is performed based on the set of weighing coefficients shown in FIG. 6B and stored in the coefficient ROM 34 so as to permit omission of the first stage of the IDCT fast algorithm for the second one-dimensional IDCT operation. The multiplication operation unit 3 outputs scaled first-stage output data at this time.

The control unit 6 controls the data register unit 4 so that the scaled first-stage output data from the multiplication operation unit 3 are stored in the data register unit 4 via the write port (WP2) of the same. As the scaled first-stage output data are stored in the data register unit 4, the control unit 6 controls the data register unit 4 to provide the available scaled first-stage output data to the butterfly operation unit 2 via the read port (RP1) in order to enable the latter to perform the second stage of the IDCT fast algorithm which involves four butterfly operations for each row (or column). The control unit 6 again controls the data register unit 4 to store the second-stage output data from the butterfly operation unit 2 therein via the write port (WP1) of the same. When predetermined ones of the second-stage output data have been stored in the data register unit 4, the control unit 6 controls the data register unit 4 to provide the predetermined ones of the second-stage output data to the multiplication operation unit 3 via the read port (RP2) in order to enable the latter to begin performing the third stage of the IDCT fast algorithm which involves three post-multiplication subtraction operations for each row (or column), while the butterfly operation unit 2 continues to perform the second stage of the IDCT fast algorithm. The control unit 6 again controls the data register unit 4 to store the third-stage output data from the multiplication operation unit 3 therein via the write port (WP2) of the same. After the butterfly operation unit 2 has finished performing the second stage of the IDCT fast algorithm, the control unit 6 controls the data register unit 4 to provide the second-stage and third-stage output data in a predetermined sequence to the butterfly operation unit 2 via the read port (RP1) in order to enable the latter to perform the fourth stage of the IDCT fast algorithm which involves four more butterfly operations for each row (or column). The control unit 6 again controls the data register unit 4 to store the fourth-stage output data from the butterfly operation unit 2 therein via the write port (WP1) of the same. When predetermined ones of the fourth-stage output data have been stored in the data register unit 4, the control unit 6 controls the data register unit 4 to provide the predetermined ones of the fourth-stage output data to the multiplication operation unit 3 via the read port (RP2) in order to enable the latter to begin performing the fifth stage of the IDCT fast algorithm which involves two post-multiplication subtraction operations for each row (or column), while the butterfly operation unit 2 continues to perform the fourth stage of the IDCT fast algorithm. The control unit 6 again controls the data register unit 4 to store the fifth-stage output data from the multiplication operation unit 3 therein via the write port (WP2). After the butterfly operation unit 2 has finished performing the fourth stage of the IDCT fast algorithm, the control unit 6 controls the data register unit 4 to provide the fourth-stage and fifth-stage output data in a predetermined sequence to the butterfly operation unit 2 via the read port (RP1) in order to enable the latter to perform the sixth stage of the IDCT fast algorithm which involves another four butterfly operations for each row (or column). The control unit 6 controls the data register unit 4 to store the sixth-stage output data, which serve as scaled one-dimensional transform data of the first one-dimensional IDCT operation, therein.

As mentioned beforehand, the first stage of the IDCT fast algorithm for the second one-dimensional IDCT operation is omitted in the IDCT method of the preferred embodiment. Thus, when the scaled one-dimensional transform data is stored in the data register unit 4, the control unit 6 controls the data register unit 4 to output sequentially a transposed order of the scaled one-dimensional transform data to the butterfly operation unit 2, e.g. in columns (or rows), via the read port (RPI) of the same, thereby enabling the butterfly operation unit 2 to perform the second stage of the IDCT fast algorithm for the second one-dimensional IDCT operation. The third to sixth stages of the IDCT fast algorithm for the second one-dimensional IDCT operation are then performed in a manner similar to that for the third to sixth stages of the IDCT fast algorithm for the first one-dimensional IDCT operation. Thereafter, the control unit 6 controls the output unit 5 to receive the sixth-stage output data from the butterfly circuit 22 of the butterfly operation unit 2 as the two-dimensional transform data in order to provide the same to an external device (not shown).

Figure 10:
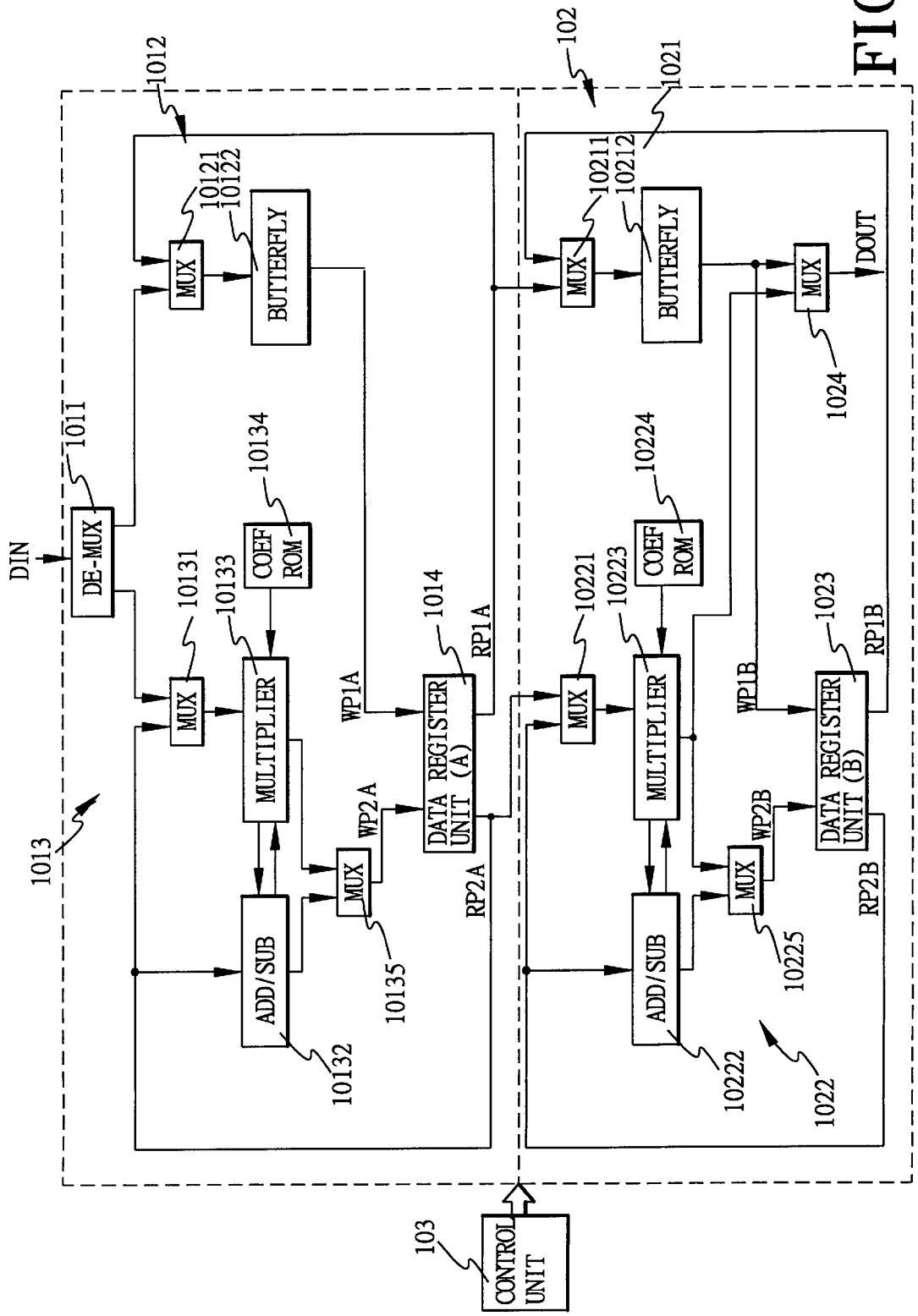
FIG. 10 is a schematic circuit block diagram of another example of a DCT/IDCT apparatus for performing the DCT/IDCT method of the preferred embodiment.

FIG. 10 illustrates another DCT/IDCT apparatus for performing the two-dimensional DCT/IDCT methods of the preferred embodiment. The construction of the DCT/IDCT apparatus is based on one described in U.S. Pat. No. 5,471, 412. The DCT/IDCT apparatus of FIG. 10 is capable of performing two-dimensional DCT/IDCT recycling and parallel pipeline processing of an 8×8 data block, and is shown to comprise two first and second one-dimensional DCT/IDCT processing units 101, 102 and a control unit 103. The first one-dimensional DCT/IDCT processing unit 101 comprises: an input unit 1011, such as a demultiplexer; a butterfly operation unit 1012 including a multiplexer 10121 and a butterfly circuit 10122; a multiplication operation unit 1013 including an input select multiplexer 10131, an addition/subtraction circuit 10132, a multiplier circuit 10133, a coefficient ROM 10134, and an output select multiplexer 10135; and a data register unit (A) 1014 which is responsible for storing the results of the various stages of the first one-dimensional DCT/IDCT operation and which also serves as a transpose memory for providing input data to the second one-dimensional DCT/IDCT processing unit 102. The second one-dimensional DCT/IDCT processing unit 102 comprises: a butterfly operation unit 1021 including a multiplexer 10211 and a butterfly circuit 10212; a multiplication operation unit 1022 including an input select multiplexer 10221, an addition/subtraction circuit 10222, a multiplier circuit 10223, a coefficient ROM 10224, and an output select multiplexer 10225; a data register unit (B) 1023; and an output unit 1024, such as a multiplexer. The multiplier circuits 10133, 10223 require a respective coefficient ROM 10134, 10224 because the sixth stage of the DCT fast algorithm is omitted in the first one-dimensional DCT operation, and because the first stage of the IDCT fast algorithm is omitted in the second one-dimensional IDCT operation. Particularly, the coefficient ROM 10134 contains a1, a2, b1, b2 and b3 during DCT processing, and q1, q2, q3, r1, r2, and Pi,j (i, j=0 to 7) during IDCT processing. The coefficient ROM 10224 contains a1, a2, b1, b2, b3 and Ci,j (i, j=0 to 7) during DCT processing, and q1, q2, q3, r1 and r2 during IDCT processing. The control unit 103 is responsible for controlling the read/write operations of the coefficient ROMs 10134, 10224 and the data register units 1014, 1023, and is also responsible for controlling the various multiplexers 10121, 10131, 10135, 10211, 10221, 10225, 1024. The control unit 103 is further responsible for controlling the timing of the operations of the remaining components of the first and second one-dimensional DCT/IDCT processing units 101, 102.

Figure 11:
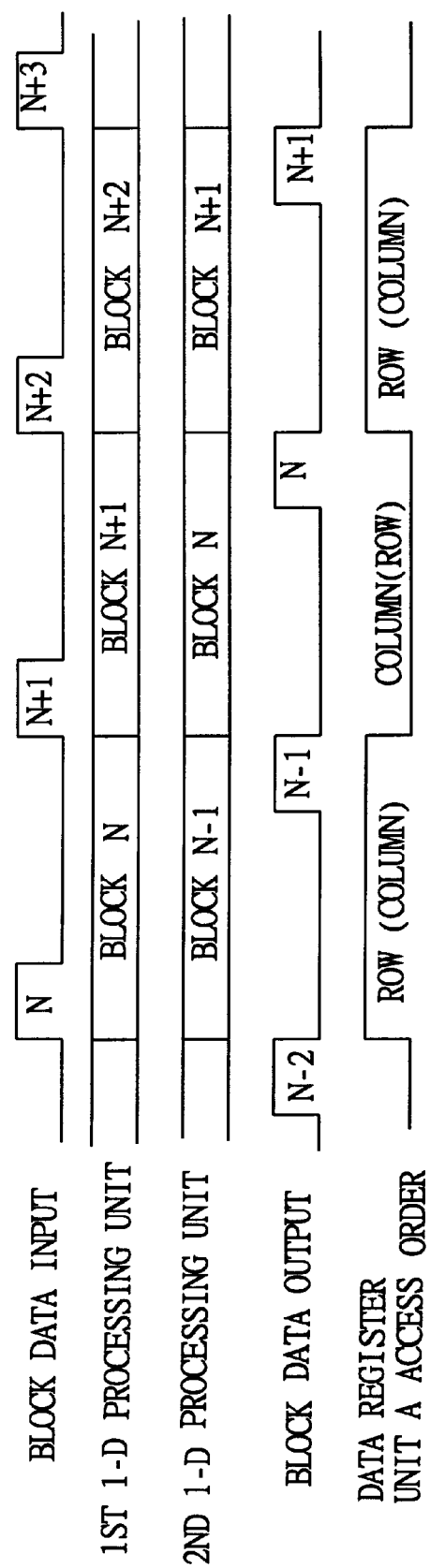
FIG. 11 is a timing diagram illustrating the operation of the apparatus of FIG. 10.

Referring to FIGS. 10 and 11, when the apparatus performs two-dimensional DCT processing, the first processing unit 101 executes the first five stages of the DCT fast algorithm of FIG. 1 to obtain scaled one-dimensional transform data that is provided to the second processing unit 102. The second processing unit 102 then performs the six stages of the DCT fast algorithm of FIG. 1 to result in the two-dimensional transform data that is transmitted by the output unit 1024 to an external device (not shown). When the apparatus performs two-dimensional IDCT processing, the first processing unit 101 executes the full six stages of the IDCT fast algorithm of FIG. 3 to obtain scaled one-dimensional transform data that is provided to the second processing unit 102. The second processing unit 102 then performs the latter five stages of the IDCT fast algorithm of FIG. 3 to result in the two-dimensional transform data that is transmitted by the output unit 1024 to the external device (not shown).

The apparatus of FIG. 10 has a processing speed which is two times that of the apparatus of FIG. 7, thus permitting a higher output bit rate.

It has thus been shown that, with the use of a set of scaled weighing coefficients in the intrinsic multiplication stage, i.e. the sixth stage, of the DCT fast algorithm for the second one-dimensional DCT operation, the sixth stage of the DCT fast algorithm for the first one-dimensional DCT operation can be omitted. Similarly, with the use of a set of scaled weighing coefficients in the intrinsic multiplication stage, i.e. the first stage, of the IDCT fast algorithm for the first one-dimensional IDCT operation, the first stage of the IDCT fast algorithm for the second one-dimensional IDCT operation can be omitted. Thus, two-dimensional DCT/IDCT processing is performed using a one-dimensional DCT/IDCT operation with six stages of the fast algorithm, and another one-dimensional DCT/IDCT operation with only five stages of the fast algorithm. Accordingly, one of the one-dimensional DCT/IDCT operations involves thirteen multiplication operations, while the other one of the one-dimensional DCT/IDCT operations involves only five multiplication operations. Consequently, the total number of multiplication operations in the two-dimensional DCT/IDCT methods of the present invention for an 8×8 data block is reduced to 144 (8×13+8×5), which is up to a 31% reduction as compared to that in the aforementioned U.S. Patent, thereby resulting in a significant increase in the processing speed.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A two-dimensional discrete cosine transform (DCT) method involving consecutive first and second one-dimensional DCT operations, each of the first and second one-dimensional DCT operations using a six-stage DCT fast algorithm to process a sequence of input data of an 8×8 data block so as to generate a sequence of transform data, the DCT fast algorithm including first, third and fifth stages that involve a plurality of butterfly operations, second and fourth stages that involve a plurality of post-addition multiplication operations, and a sixth stage that involves a plurality of intrinsic multiplication operations, said two-dimensional DCT method comprising the steps of:

(a) providing an input unit to receive the input data;

(b) controlling the input unit to provide the input data to a butterfly operation unit in order to enable the butterfly operation unit to perform the first stage of the DCT fast algorithm for the first one-dimensional DCT operation;

(c) controlling a data register unit to store first-stage output data from the butterfly operation unit therein;

(d) controlling the data register unit to provide predetermined ones of the first-stage output data to a multiplication operation unit in order to enable the multiplication operation unit to perform the second stage of the DCT fast algorithm when the predetermined ones of the first-stage output data have been stored in the data register unit;

(e) controlling the data register unit to store second-stage output data from the multiplication operation unit therein;

(f) controlling the data register unit to provide the first-stage and second-stage output data in a predetermined sequence to the butterfly operation unit in order to enable the butterfly operation unit to perform the third stage of the DCT fast algorithm after the butterfly operation unit has finished performing the first stage of the DCT fast algorithm;

(g) controlling the data register unit to store third-stage output data from the butterfly operation unit therein;

(h) controlling the data register unit to provide predetermined ones of the third-stage output data to the multiplication operation unit in order to enable the multiplication operation unit to perform the fourth stage of the DCT fast algorithm when the predetermined ones of the third-stage output data have been stored in the data register unit;

(i) controlling the data register unit to store fourth-stage output data from the multiplication operation unit therein;

(j) controlling the data register unit to provide the third-stage and fourth-stage output data in a predetermined sequence to the butterfly operation unit in order to enable the butterfly operation unit to perform the fifth stage of the DCT fast algorithm after the butterfly operation unit has finished performing the third stage of the DCT fast algorithm;

(k) controlling the data register unit to store fifth-stage output data from the butterfly operation unit therein, the fifth-stage output data serving as scaled one-dimensional transform data;

(l) controlling the data register unit to provide a transposed order of the scaled one-dimensional transform data to the butterfly operation unit in order to enable the butterfly operation unit to perform the first stage of the DCT fast algorithm for the second one-dimensional DCT operation;

(m) repeating steps (c) to (j) to perform the second to fifth stages of the DCT fast algorithm for the second one-dimensional DCT operation;

(n) controlling the data register unit to store the fifth-stage output data from the butterfly operation unit therein, the fifth-stage output data serving as scaled two-dimensional transform data;

(o) controlling the data register unit to provide the scaled two-dimensional transform data to the multiplication operation unit in order to enable the multiplication operation unit to perform the sixth stage of the DCT fast algorithm for the second one-dimensional DCT operation based on a set of scaled weighing coefficients stored in a coefficient ROM of the multiplication operation unit, thereby resulting in the two-dimensional transform data corresponding to the input data, the scaled weighing coefficients being a product of sixth-stage weighing coefficients of the DCT fast algorithms for the first and second one-dimensional DCT operations; and (p) controlling an output unit to receive the two-dimensional transform data from the multiplication operation unit.

2. A two-dimensional discrete cosine transform (DCT) method based on a six-stage DCT fast algorithm including first, third and fifth stages that involve a plurality of butterfly operations, second and fourth stages that involve a plurality of post-addition multiplication operations, and a sixth stage that involves a plurality of intrinsic multiplication operations, said two-dimensional DCT method comprising the steps of:

(a) storing a set of scaled weighing coefficients in a coefficient ROM of a multiplication operation unit, the scaled weighing coefficients being a product of sixth-stage weighing coefficients of the DCT fast algorithm in a first one-dimensional transform and in a second one-dimensional transform;

(b) controlling a butterfly operation unit and the multiplication operation unit to perform the first to fifth stages of the DCT fast algorithm on input data to obtain scaled one-dimensional transform data;

(c) controlling the butterfly operation unit and the multiplication operation unit to perform the first to fifth stages of the DCT fast algorithm on the scaled one-dimensional transform data to obtain scaled two-dimensional transform data; and (d) controlling the multiplication operation unit to perform the sixth stage of the DCT fast algorithm on the scaled two-dimensional transform data based on the scaled weighing coefficients in the coefficient ROM, thereby resulting in the two-dimensional transform data corresponding to the input data.

3. A method of reducing number of multiplication operations in a two-dimensional discrete cosine transform (DCT) apparatus that performs first and second one-dimensional DCT operations successively, each of the first and second one-dimensional DCT operations involving a six-stage DCT fast algorithm to process a sequence of input data of an 8×8 data block so as to generate a sequence of transform data, the DCT fast algorithm including first, third and fifth stages that involve a plurality of butterfly operations performed by a butterfly operation unit of the two-dimensional DCT apparatus, second and fourth stages that involve a plurality of post-addition multiplication operations performed by a multiplication operation unit of the two-dimensional DCT apparatus, and a sixth stage that involves a plurality of intrinsic multiplication operations performed by the multiplication operation unit, said method comprising the steps of:

(a) storing a set of scaled weighing coefficients in a coefficient ROM of the multiplication operation unit, the scaled weighing coefficients being a product of sixth-stage weighing coefficients of the DCT fast algorithms for the first and second one-dimensional DCT operations;

(b) after the butterfly operation unit has finished performing the fifth stage of the DCT fast algorithm for the first one-dimensional DCT operation to result in scaled one-dimensional transform data, controlling the butterfly operation unit to perform the first stage of the DCT fast algorithm for the second one-dimensional DCT operation on a transposed order of the scaled one-dimensional transform data; and (c) after the butterfly operation unit has finished performing the fifth stage of the DCT fast algorithm for the second one-dimensional DCT operation to result in scaled two-dimensional transform data, controlling the multiplication operation unit to perform the sixth stage of the DCT fast algorithm for the second one-dimensional DCT operation on the scaled two-dimensional transform data based on the scaled weighing coefficients in the coefficient ROM, thereby resulting in the two-dimensional transform data corresponding to the input data.

4. A two-dimensional inverse discrete cosine transform (IDCT) method involving consecutive first and second one-dimensional IDCT operations, each of the first and second one-dimensional IDCT operations using a six-stage IDCT fast algorithm to process a sequence of input data of an 8×8 data block so as to generate a sequence of transform data, the IDCT fast algorithm including a first stage that involves a plurality of intrinsic multiplication operations, second, fourth and sixth stages that involve a plurality of butterfly operations, and third and fifth stages that involve a plurality of post-multiplication subtraction operations, said two-dimensional IDCT method comprising the steps of:

(a) providing an input unit to receive the input data;

(b) controlling the input unit to provide the input data to a multiplication operation unit in order to enable the multiplication operation unit to perform the first stage of the IDCT fast algorithm for the first one-dimensional IDCT operation based on a set of scaled weighing coefficients stored in a coefficient ROM of the multiplication operation unit, the scaled weighing coefficients being a product of first-stage weighing coefficients of the IDCT fast algorithms for the first and second one-dimensional IDCT operations;

(c) controlling a data register unit to store scaled first-stage output data from the multiplication operation unit therein;

(d) controlling the data register unit to provide the scaled first-stage output data to a butterfly operation unit in order to enable the butterfly operation unit to perform the second stage of the IDCT fast algorithm for the first one-dimensional IDCT operation;

(e) controlling the data register unit to store second-stage output data from the butterfly operation unit therein;

(f) controlling the data register unit to provide predetermined ones of the second-stage output data to the multiplication operation unit in order to enable the multiplication operation unit to perform the third stage of the IDCT fast algorithm when the predetermined ones of the second-stage output data have been stored in the data register unit;

(g) controlling the data register unit to store third-stage output data from the multiplication operation unit therein;

(h) controlling the data register unit to provide the second-stage and third-stage output data in a predetermined sequence to the butterfly operation unit in order to enable the butterfly operation unit to perform the fourth stage of the IDCT fast algorithm after the butterfly operation unit has finished performing the second stage of the IDCT fast algorithm;

(i) controlling the data register unit to store fourth-stage output data from the butterfly operation unit therein;

(j) controlling the data register unit to provide predetermined ones of the fourth-stage output data to the multiplication operation unit in order to enable the multiplication operation unit to perform the fifth stage of the IDCT fast algorithm when the predetermined ones of the fourth-stage output data have been stored in the data register unit;

(k) controlling the data register unit to store fifth-stage output data from the multiplication operation unit therein;

(l) controlling the data register unit to provide the fourth-stage and fifth-stage output data in a predetermined sequence to the butterfly operation unit in order to enable the butterfly operation unit to perform the sixth stage of the IDCT fast algorithm after the butterfly operation unit has finished performing the fourth stage of the IDCT fast algorithm;

(m) controlling the data register unit so as to store scaled one-dimensional transform data generated by the butterfly operation unit in step (l) therein;

(n) controlling the data register unit to provide a transposed order of the scaled one-dimensional transform data to the butterfly operation unit in order to enable the butterfly operation unit to perform the second stage of the IDCT fast algorithm for the second one-dimensional IDCT operation;

(o) repeating steps (e) to (l) to perform the third to sixth stages of the IDCT fast algorithm for the second one-dimensional IDCT operation; and (p) after step (o), controlling an output unit to receive the sixth-stage output data from the butterfly operation unit as the two-dimensional transform data corresponding to the input data.

5. A two-dimensional inverse discrete cosine transform (IDCT) method based on a six-stage IDCT fast algorithm including a first stage that involves a plurality of intrinsic multiplication operations, second, fourth and sixth stages that involve a plurality of butterfly operations, and third and fifth stages that involve a plurality of post-multiplication subtraction operations, said two-dimensional IDCT method comprising the steps of:

(a) storing a set of scaled weighing coefficients in a coefficient ROM of a multiplication operation unit, the scaled weighing coefficients being a product of first-stage weighing coefficients of the IDCT fast algorithm in a first one-dimensional transform and in a second one-dimensional transform;

(b) controlling the multiplication operation unit to perform the first stage of the IDCT fast algorithm on input data using the scaled weighing coefficients in the coefficient ROM, thereby resulting in scaled first-stage output data;

(c) controlling a butterfly operation unit and the multiplication operation unit to perform the second to sixth stages of the IDCT fast algorithm on the scaled first-stage output data to obtain scaled one-dimensional transform data; and (d) controlling the butterfly operation unit and the multiplication operation unit to perform the second to sixth stages of the IDCT fast algorithm on the scaled one-dimensional transform data to obtain the two-dimensional transform data corresponding to the input data.

6. A method of reducing number of multiplication operations in a two-dimensional inverse discrete cosine transform (IDCT) apparatus that performs first and second one-dimensional IDCT operations successively, each of the first and second one-dimensional IDCT operations using a six-stage IDCT fast algorithm to process a sequence of input data of an 8×8 data block so as to generate a sequence of transform data, the IDCT fast algorithm including a first stage that involves a plurality of intrinsic multiplication operations performed by a multiplication operation unit of the two-dimensional IDCT apparatus, second, fourth and sixth stages that involve a plurality of butterfly operations performed by a butterfly operation unit of the two-dimensional IDCT apparatus, and third and fifth stages that involve a plurality of post-multiplication subtraction operations performed by the multiplication operation unit, said method comprising the steps of:

(a) storing a set of scaled weighing coefficients in a coefficient ROM of the multiplication operation unit, the scaled weighing coefficients being a product of first-stage weighing coefficients of the IDCT fast algorithms for the first and second one-dimensional IDCT operations;

(b) controlling the multiplication operation unit to perform the first stage of the IDCT fast algorithm for the first one-dimensional IDCT operation on the input data based on the scaled weighing coefficients in the coefficient ROM, thereby resulting in scaled first-stage output data;

(c) controlling the butterfly operation unit to perform the second stage of the IDCT fast algorithm for the first one-dimensional IDCT operation on the scaled first-stage output data; and (d) after the butterfly operation unit has finished performing the sixth stage of the IDCT fast algorithm for the first one-dimensional IDCT operation to result in scaled one-dimensional transform data, controlling the butterfly operation unit to perform the second stage of the IDCT fast algorithm for the second one-dimensional IDCT operation on the scaled one-dimensional transform data.

* * * * *

UNITED STATES PATENT AND TRADEMARK OFFICE
CERTIFICATE OF CORRECTION

PATENT NO. : 6,189,021 B1
DATED : February 13, 2001
INVENTOR(S) : R.-F. Shyu

It is certified that error appears in the above-identified patent and that said Letters Patent is hereby corrected as shown below:

Title page, Item [54], and Column 1, lines 1-5,
"METHOD FOR FORMING TWO-DIMENSIONAL DISCRETE COSINE TRANSFORM AND ITS INVERSE INVOLVING A REDUCED NUMBER OF MULTIPLICATION OPERATIONS" should read -- METHOD FOR PERFORMING TWO-DIMENSIONAL DISCRETE COSINE TRANSFORM AND ITS INVERSE INVOLVING A REDUCED NUMBER OF MULTIPLICATION OPERATIONS --

Column 2, Primary Examiner,
"Ohuong" should read -- Chuong --

Signed and Sealed this

Eleventh Day of December, 2001

Attest:

NICHOLAS P. GODICI
Attesting Officer
*Acting Director of the United States Patent and Trademark Office*

UNITED STATES PATENT AND TRADEMARK OFFICE
CERTIFICATE OF CORRECTION

PATENT NO. : 6,189,021 B1　　　　　　　　　　　　　　　　　　　　　Page 1 of 1
DATED : February 13, 2001
INVENTOR(S) : R.-F. Shyu It is certified that error appears in the above-identified patent and that said Letters Patent is hereby corrected as shown below:

Title page, Item [54], and Column 1, lines 1-5,
"METHOD FOR FORMING TWO-DIMENSIONAL DISCRETE COSINE TRANSFORM AND ITS INVERSE INVOLVING A REDUCED NUMBER OF MULTIPLICATION OPERATIONS" should read -- METHOD FOR PERFORMING TWO-DIMENSIONAL DISCRETE COSINE TRANSFORM AND ITS INVERSE INVOLVING A REDUCED NUMBER OF MULTIPLICATION OPERATIONS --

Column 2, Primary Examiner,
"Ohuong" should read -- Chuong --

Signed and Sealed this

Eighteenth Day of December, 2001

Attest:

Attesting Officer

JAMES E. ROGAN
*Director of the United States Patent and Trademark Office*